(12) United States Patent  
Burgin et al.

(10) Patent No.: US 8,319,667 B2
(45) Date of Patent: Nov. 27, 2012

(54) MISSED APPROACH PROCEDURE DISPLAY SYSTEM AND METHOD

(75) Inventors: Roger W. Burgin, Scottsdale, AZ (US); Blake Wilson, Peoria, AZ (US); Sandy Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1296 days.

(21) Appl. No.: 12/045,898

(22) Filed: Mar. 11, 2008

(65) Prior Publication Data

US 2009/0231164 A1 Sep. 17, 2009

(51) Int. Cl.
| | |
|---|---|
| G01C 23/00 | (2006.01) |
| G01C 21/00 | (2006.01) |
| G01B 21/00 | (2006.01) |
| G08G 1/123 | (2006.01) |
| G08B 5/00 | (2006.01) |
| G05D 1/00 | (2006.01) |
| G06G 7/70 | (2006.01) |
| G06G 1/16 | (2006.01) |

(52) U.S. Cl. ... 340/971; 340/972; 340/979; 340/995.19; 340/995.21; 340/947; 340/948; 340/945; 340/963; 340/964; 701/11; 701/16; 701/17; 701/18; 701/122; 701/301

(58) Field of Classification Search .................. None
See application file for complete search history.

(56) References Cited

U.S. PATENT DOCUMENTS

| | | | |
|---|---|---|---|
| 5,323,321 A | 6/1994 | Smith, Jr. | |
| 5,526,265 A * | 6/1996 | Nakhla | 701/16 |
| 5,654,892 A | 8/1997 | Fujii et al. | |
| 6,438,469 B1 * | 8/2002 | Dwyer et al. | 701/16 |
| 6,744,396 B2 | 6/2004 | Stone et al. | |
| 6,812,828 B2 | 11/2004 | Jung | |
| 6,871,124 B1 | 3/2005 | McElreath | |
| 6,980,892 B1 | 12/2005 | Chen et al. | |
| 7,142,131 B2 | 11/2006 | Sikora | |
| 7,286,911 B2 | 10/2007 | Kane | |
| 7,640,082 B2 * | 12/2009 | Dwyer | 701/3 |
| 7,693,621 B1 * | 4/2010 | Chamas | 701/16 |
| 2003/0018427 A1 | 1/2003 | Yokota et al. | |
| 2005/0273252 A1 | 12/2005 | Nix et al. | |
| 2006/0253232 A1 * | 11/2006 | Gerrity et al. | 701/16 |
| 2007/0260364 A1 | 11/2007 | Dwyer | |
| 2008/0004757 A1 * | 1/2008 | Ingram et al. | 701/11 |
| 2010/0250033 A1 * | 9/2010 | Ingram et al. | 701/11 |

FOREIGN PATENT DOCUMENTS

| | | |
|---|---|---|
| EP | 1091190 A2 | 4/2001 |
| WO | 0157828 A1 | 8/2001 |

OTHER PUBLICATIONS

EP Search Report, 09153056.8 dated May 25, 2009.

* cited by examiner

*Primary Examiner* — Julie Lieu
(74) *Attorney, Agent, or Firm* — Ingrassia Fisher & Lorenz, P.C.

(57) ABSTRACT

A system and method of conveying missed approach procedures to a pilot are provided. The system and method include rendering a graphic representation of at least one leg of the missed approach procedure on a display. A determination is made as to whether the aircraft is at least substantially flying the at least one leg of the missed approach procedure. At least one visual characteristic of the rendered graphic is selectively varied based on the determination of whether the aircraft is at least substantially flying the at least one leg of the missed approach procedure.

17 Claims, 6 Drawing Sheets

MISSED APPROACH PROCEDURE DISPLAY SYSTEM AND METHOD

TECHNICAL FIELD

The present invention generally relates to aircraft display systems and methods and, more particularly, to aircraft display systems and methods for displaying missed approach procedures.

BACKGROUND

A missed approach is an instrument flight rules procedure that is initiated and conducted by a pilot when an instrument approach cannot be completed to a landing. More specifically, if the pilot determines, by the time the aircraft is at a decision height (for a precision approach) or missed approach point (for a non-precision approach), that the instrument approach cannot be completed, the approach is discontinued and the missed approach procedure is initiated.

Missed approach procedures vary from airfield to airfield. Moreover, each airfield may have a plurality of missed approach procedures, depending on the number of instrument approaches associated with the airfield. In any case, a missed approach procedure typically includes an initial heading or track and altitude to which the aircraft is to climb, followed by holding instructions at a nearby navigation fix.

In most instances, missed approach procedures are provided, both graphically and textually, on the terminal procedures (or "approach plates") associated with an airfield. While this method of providing missed approach procedures is generally safe and reliable, it does suffer certain drawbacks. For example, the pilot may need to undesirably refer to the terminal procedure while flying the missed approach procedure to ensure the procedure is being followed correctly and/or the pilot may not be readily aware of where the aircraft is in the missed approach, because the aircraft is in autopilot or the other pilot is actually flying the aircraft.

Accordingly, it is desirable to provide a means of conveying missed approach procedures to a pilot in real-time and/or a means of providing feedback to the pilot as to where the aircraft is in the missed approach procedure. The present invention addresses at least these needs.

BRIEF SUMMARY

In one embodiment, and by way of example only, a method of conveying missed approach procedures to a pilot includes rendering a graphic representation of at least one leg of the missed approach procedure on a display. A determination is made as to whether the aircraft is at least substantially flying the at least one leg of the missed approach procedure. At least one visual characteristic of the rendered graphic is selectively varied based on the determination of whether the aircraft is at least substantially flying the at least one leg of the missed approach procedure.

In another embodiment, a display system for conveying missed approach procedures to a pilot includes a display and a processor. The display is configured to render a graphic representation of at least one leg of the missed approach procedure. The processor is coupled to the display. The processor is operable to determine whether the aircraft is at least substantially flying the at least one leg of the missed approach procedure and, in response to the determination, to selectively command the display to vary at least one visual characteristic of the graphic rendered thereon.

In still another embodiment, a method of generating missed approach procedure data representative of a missed approach procedure that comprises a plurality of remarks includes parsing the plurality of remarks into a plurality of tokens that each comprise one or more alphanumeric characters. Aircraft constraint data and graphic data are generated based on each of the remarks.

In yet another exemplary embodiment, a method of generating missed approach procedure data representative of a missed approach procedure includes receiving air traffic control communications that include missed approach procedure instructions. The received instructions are parsed, aircraft constraint data and graphic data are generated based on the parsed instructions.

Other desirable features and characteristics of the display system and method will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
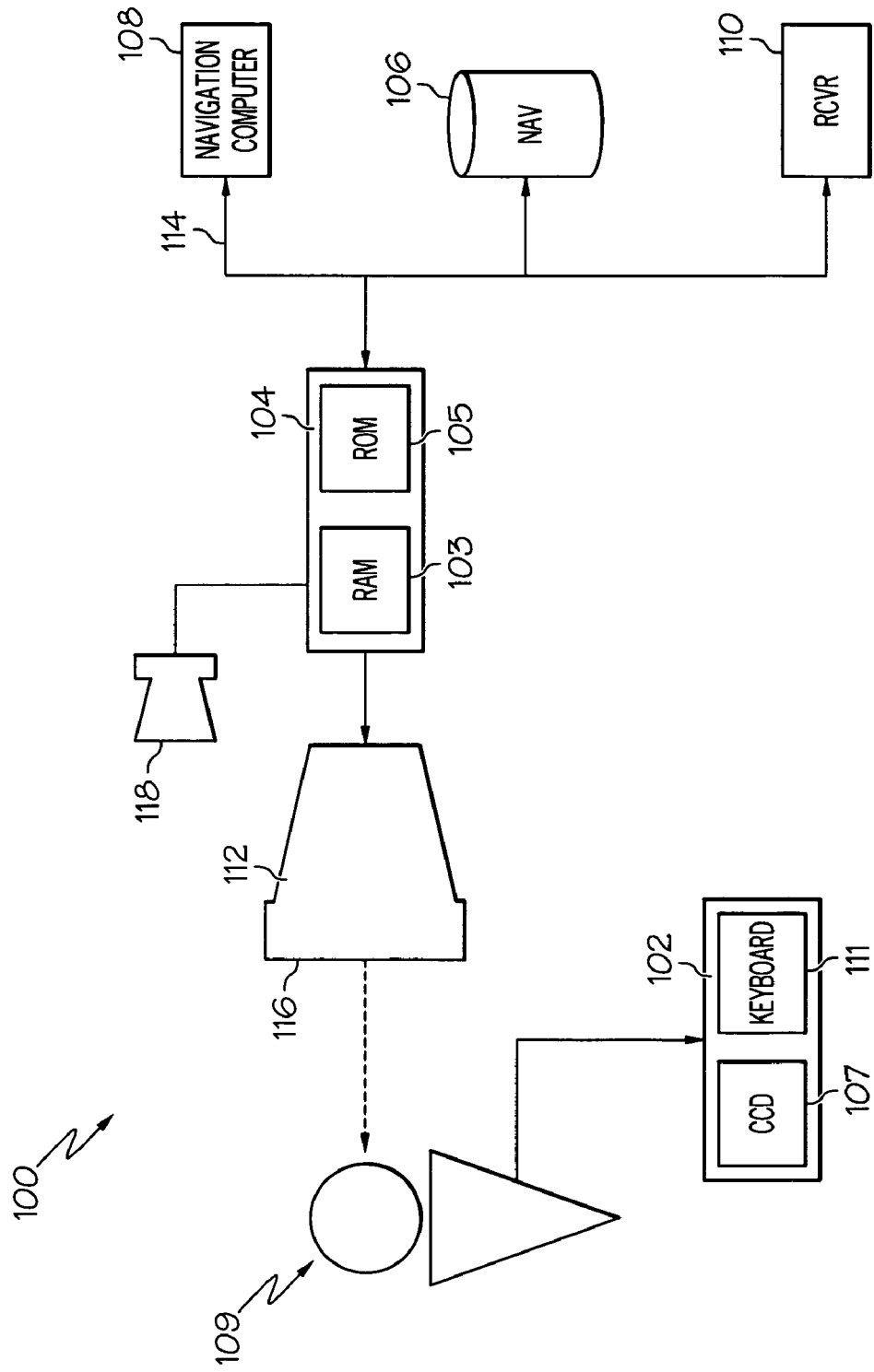
FIG. 1 is a functional block diagram of a flight deck display system according to one embodiment of the present invention.

The following detailed description is merely exemplary in nature and is not intended to limit the invention or the application and uses of the invention. Furthermore, there is no intention to be bound by any theory presented in the preceding background or the following detailed description. Moreover, various embodiments of the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to FIG. 1, a portion of an exemplary flight deck display system is depicted and will be described. The system 100 includes at least a user interface 102, a processor 104, one or more navigation databases 106, a navigation computer 108, and one or more display devices 112 (only one depicted). The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on a display screen 116 of the display device 112, and to select various images rendered on the display screen 1 16, and may use the keyboard 111 to, among other things, input various data.

The processor 104 is in operable communication with the navigation computer 108 and the display device 112 via, for example, a communication bus 114. The processor 104 is coupled to receive various types of data from the navigation computer 108 and may additionally receive navigation data from one or more of the navigation databases 106, and is operable to command to the display device 112 to render various images. Though not shown in FIG. 1, it will be appreciated that the processor 104 may additionally be coupled to receive various data from one or more other external systems. For example, the processor 104 may also be in operable communication with a source of weather data, a terrain avoidance and warning system (TAWS), a traffic and collision avoidance system (TCAS), an instrument landing system (ILS), and a runway awareness and advisory system (RAAS), just to name a few. If the processor 104 is in operable communication with one or more of these external systems, it will be appreciated that the processor 104 may additionally be configured to command the display device 112 to at least selectively render the data supplied from these external systems.

The processor 104 may include one or more microprocessors, each of which may be any one of numerous known general-purpose microprocessors or application specific processors that operate in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just one or more programmable processors. For example, digital logic circuits and analog signal processing circuits could also be used.

The navigation databases 106 include various types of navigation-related data. These navigation-related data include various flight plan related data such as, for example, waypoints, distances between waypoints, headings between waypoints, navigational aids, obstructions, special use airspace, political boundaries, communication frequencies, protected airspace data, data related to different airports including, for example, runway-related data, and aircraft approach information including, as will be described further below, missed approach procedures. It will be appreciated that, although the navigation databases 106 are, for clarity and convenience, shown as being stored separate from the processor 104, all or portions of these databases 106 could be loaded into the on-board RAM 103, or integrally formed as part of the processor 104, and/or RAM 103, and/or ROM 105. The navigation databases 106, or data forming portions thereof, could also be part of one or more devices or systems that are physically separate from the display system 100.

The navigation computer 108 is in operable communication, via the communication bus 114, with various data sources including, for example, the navigation databases 106. The navigation computer 108 is used, among other things, to allow the pilot 109 to program a flight plan from one destination to another, and to input various other types of flight-related data. The flight plan data may then be supplied, via the communication bus 114, to the processor 104 and, in some embodiments, to a non-illustrated flight director. In the depicted embodiment, the navigation computer 108 is additionally configured to supply, via the communication bus 114, data representative of the current flight path and the aircraft category to the processor 104. In this regard, the navigation computer 108 receives various types of data representative of the current aircraft state such as, for example, aircraft speed, altitude, and heading. The navigation computer 108 supplies the programmed flight plan data, the current flight path data, and, when appropriate, the aircraft category to the processor 104, via the communication bus 114. The processor 104 in turn command the display device 112 to render the programmed flight plan, or at least portions thereof, and the current flight path, either alone or in combination. The processor 104 also receives data from the navigation databases 106, either directly or indirectly, and in turn supplies appropriate display commands to the display device so that at least a portion of the retrieved data are displayed on the display device 112 along with the flight plan and/or current flight path. It will additionally be appreciated that all or portions of the data mentioned herein may be entered manually by a user, such as the pilot 109.

As FIG. 1 also depicts, the system 100 may further include a suitable receiver 110. The receiver 110, if included, is preferably in operable communication with either, or both, the navigation computer 108 and the processor 104. In either case, the receiver 110 is configured to receive communications (either directly or indirectly) supplied from, for example, an air traffic control tower. The communications may be voice communications supplied from, for example, an air traffic controller, or the communications may be data communications such as, for example, data supplied from a CPDLC (Controller/Pilot Data Link Communications) system. As will be described in more detail further below, the voice or data received by the receiver 110 may be processed, in real-time, by either the processor 104 or the navigation computer 108 to generate appropriate missed approach procedure data.

The display device 112 is used to display various images and data, in both a graphical and a textual format, on the display area 116, and to supply visual feedback to the user 109 in response to the user input commands supplied by the user 109 to the user interface 102. It will be appreciated that the display device 112 may be one or more of a primary flight display (PFD) or a multi-function display (MFD), and may be implemented using any one of numerous known displays suitable for rendering image and/or text data in a format viewable by the user 109. Some non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, the display device 112 includes a panel display. Moreover, before proceeding further it is noted that although the system 100 is depicted, for clarity, as including only a single display device 112, the system 100 could be implemented with a plurality of display devices 112.

As was previously noted, if the pilot 109 determines, during an instrument approach, that the approach cannot be completed, the approach is aborted and the appropriate missed approach procedure is initiated. Thus, the processor 104 is configured to selectively command the display device 112, in addition to or instead of one or more of the features mentioned above, to render at least a portion of the missed approach procedure that is being, or is going to be, initiated. Preferably, the processor 104 is responsive to appropriate user input that is supplied to the user interface 102 to command the display device 112 to render the missed approach procedure (or portion thereof). It will nonetheless be appreciated that the processor 104, at least in some embodiments, could be configured to automatically command the display device 112 to render the missed approach procedure (or portion thereof).

As is generally known, a missed approach procedure typically (though not necessarily) includes multiple legs. It will thus be appreciated that the processor 104 may command the display device 112 to render the entire missed approach procedure or only a portion (e.g., one or more legs) of the missed approach procedure. It will additionally be appreciated that the processor 104 may command the display device 112 to render the missed approach procedure (or portion thereof) graphically, textually, or both. Preferably, as will now be described, the processor 104 commands the display device 112 to render the missed approach procedure (or portion thereof) both graphically and textually. It will be appreciated that in such embodiments, the graphics and text may be rendered on the same display device 112 or on separate display devices.

Figure 2:
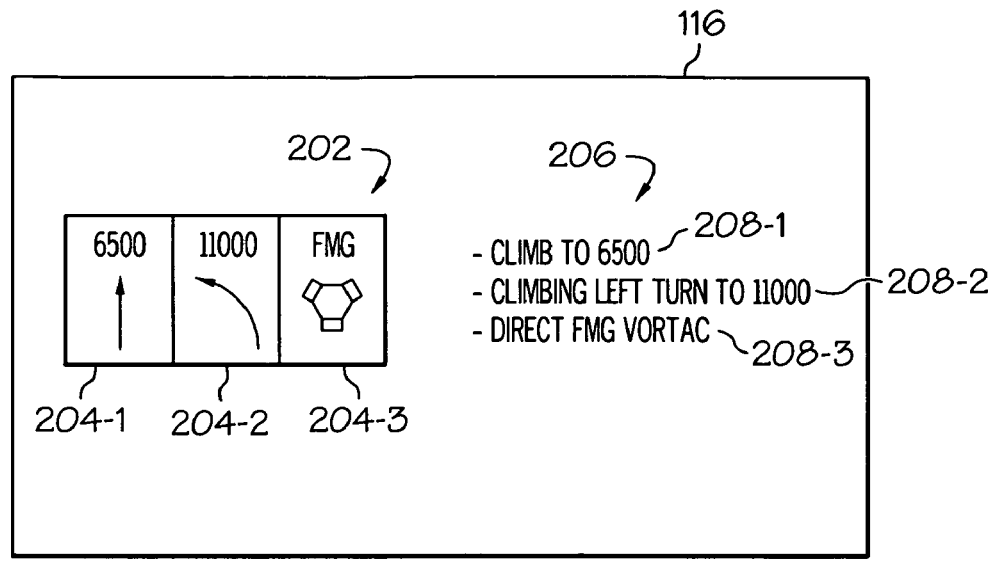
FIG. 2 is a simplified representation of an exemplary display screen that may be used in the system of FIG. 1.

Turning now to FIG. 2, a simplified representation of the display area 116 is depicted with a missed approach procedure rendered thereon. In the depicted embodiment, the missed approach procedure is a multi-leg procedure, and is rendered in its entirety as a graphic 202 that is representative of the procedure. Because the missed approach procedure is a multi-leg procedure, the rendered graphic 202 includes a plurality of icons 204 (e.g., 204-1, 204-2, 204-3), with each icon 204 being representative of one leg of the rendered missed approach procedure. Although the missed approach procedure depicted in FIG. 2 includes only three legs, it will be appreciated that some missed approach procedures may include more or less than this number of legs, and thus the rendered graphic 202 may include more or less than this number of icons (e.g., 204-1, 204-2, 204-3 ... 204-N).

In addition to being rendered graphically, the missed approach procedure is, at least in the depicted embodiment, rendered in the display area using text 206. Because the depicted missed approach procedure includes three legs, the text 206 is rendered as three separate textual strings (e.g., 208-1, 208-2, 208-3), with each string textually representing one leg of the procedure. As with the rendered graphic 202, it will be appreciated that the text 206 may include more or less than this number of textual strings (e.g., 208-1, 208-2, 208-3 ... 208-N). Again, as was previously noted, although the graphic 202 and text 206 are, for the sake of clarity and ease of description, depicted as being rendered on the same display device 112, the graphic 202 and text 206 could be rendered on separate display devices 112.

In addition to selectively displaying at least a portion of a missed approach procedure to a pilot 109, the system 100 is further configured to provide visual feedback to the pilot 109 regarding which leg of the missed approach procedure the aircraft is flying, or should be flying. To implement this functionality, the processor 104 is additionally configured to selectively command the display device 112 to vary at least one visual characteristic of the rendered graphic 202. For example, in the embodiment depicted in FIG. 2, when the aircraft should be flying the first leg of the rendered missed approach procedure, the processor 104 will command the display device 112 to render the icon 204-1 that is representative of this leg differently from the other icons (e.g., 204-2, 204-3). Then, when the aircraft should be flying the second leg of the rendered missed approach procedure, the processor 104 will command the display device 112 to render the icon 204-2 that is representative of this leg differently from the other icons (e.g., 204-1, 204-3), and so on. It will be appreciated that the specific visual characteristic that is selectively varied may be any one or more of numerous visual characteristics. Some non-limiting examples include one or more of the color, the relative intensity, and/or the relative size of the icons 204.

In addition to the above, it will be appreciated that in some embodiments the processor 104 may also be configured to command the display device 112 to render the icon 204 representative of the leg that is to be flown next, and/or the icon 204 representative of the leg that was just flown, to be rendered differently from the other icons 204. For example, when the aircraft should be flying the first leg of the rendered missed approach procedure, the processor 104 may command the display device 112 to render the icon 204-2 that is representative of the second leg differently from the icons (e.g., 204-1, 204-3) that are representative of the first and third legs. Then, when the aircraft should be flying the second leg of the rendered missed approach procedure, the processor 104 may command the display device 112 to render the icon 204-3 representative of the third leg differently from the icons (e.g., 204-1, 204-2) that are representative of the first and second legs, and so on. As with the discussion in the previous paragraph, it will be appreciated that the specific visual characteristic that is selectively varied may be any one or more of numerous visual characteristics. Some non-limiting examples include one or more of the color, the relative intensity, and/or the relative size of the icons 204.

In addition to the above, the system 100 is also preferably configured to alert the pilot 109 if the aircraft is not being flown in accordance with the rendered missed approach procedure. To implement this functionality, the processor 104 is further configured to determine whether the aircraft is flying, or is at least substantially flying, the appropriate leg of the missed approach procedure. The processor 104, based on this determination, selectively commands the display device 112 to vary at least one visual characteristic of the rendered graphic 202. For example, in the embodiment depicted in FIG. 2, if the processor 104 determines that the aircraft is not flying (or at least substantially not flying) the first leg of the rendered missed approach procedure when it should be flying this leg, the processor 104 will command the display device 112 to render the icon 204-1 that is representative of this leg using a visual characteristic that readily conveys this information to the pilot. Again, it will be appreciated that the specific visual characteristic that is selectively varied may be any one or more of numerous visual characteristics. Some non-limiting examples include one or more of the color, the relative intensity, and/or the relative size of the icons 204.

It will be appreciated that the processor 104 may be variously configured to make the determination as to whether the aircraft is flying (or at least substantially flying) the appropriate leg of the missed approach procedure. In the depicted embodiment, and with reference once again to FIG. 1, the processor 104 receives data representative of aircraft state (e.g., aircraft altitude, aircraft speed, aircraft heading, aircraft position, etc.) from the navigation computer 108. The processor 104 compares these data to constraints (described in more detail further below) associated with the rendered missed approach procedure to determine whether the aircraft is actually flying (or at least substantially flying) the appropriate leg of the missed approach procedure.

Figure 3:
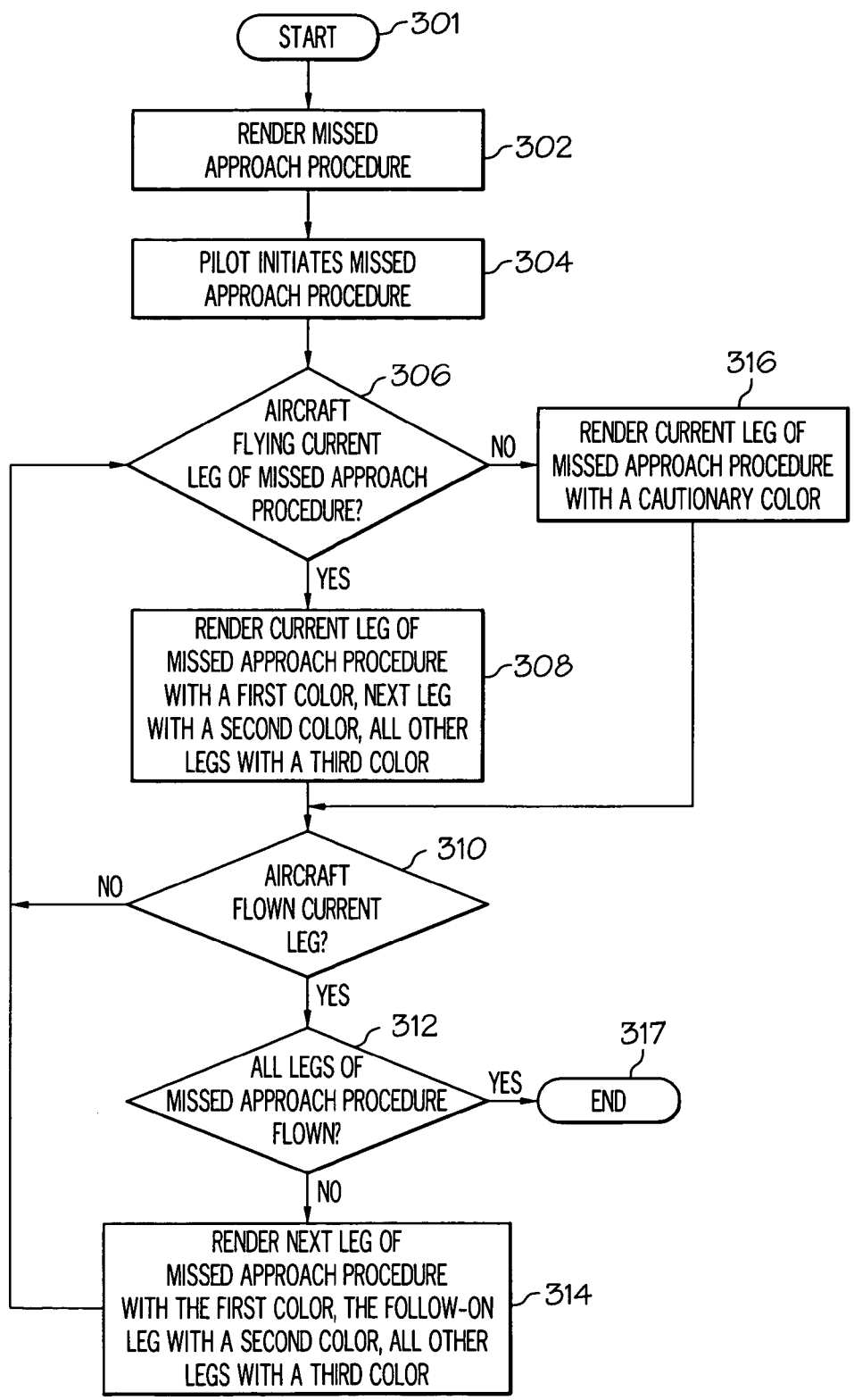
FIG. 3 depicts a process, in flowchart form, of an exemplary method of displaying missed approach procedures.

An exemplary process 300 that may be executed by the system 100 to implement the above-described functions is depicted in flowchart form in FIG. 3. With reference thereto, in combination with FIGS. 1 and 4-6 as needed, a brief description of the depicted process 300 will now be provided. In doing so, it is noted that the system 100, for ease of description, is assumed to be configured such that the visual characteristic of the rendered icons 204 that is selectively varied is color (represented in the drawings by cross-hatching). It is additionally noted that the system 100, for the sake of the depicted embodiment, is assumed to be configured to render a missed approach procedure only graphically, and in its entirety. Moreover, it should be noted that the reference numerals in parentheses in the following paragraphs refer to like numbered flowchart blocks in FIG. 3.

Figure 4:
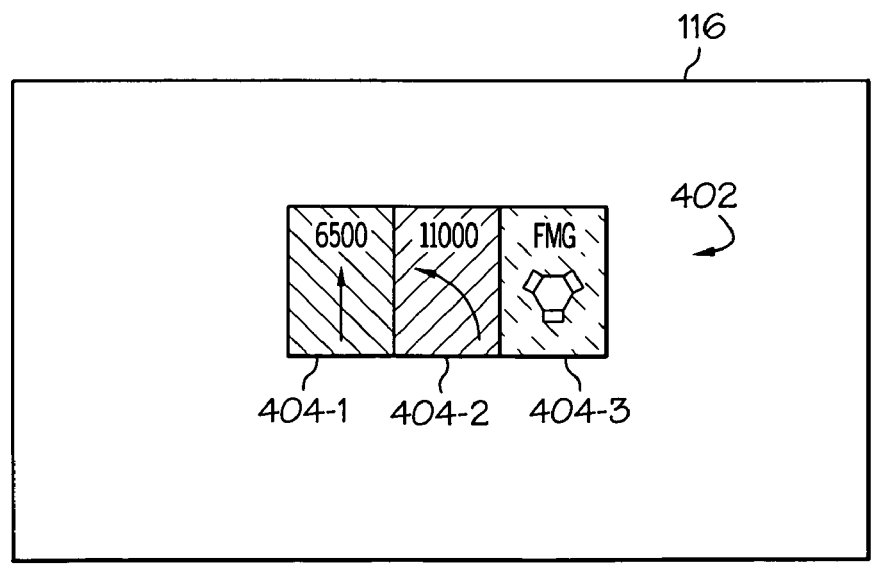
FIGS. 4-7 are each exemplary display screens that depict rendered missed approach procedure graphics.

Referring first to FIG. 4, it is seen that before the pilot 109 initiates a missed approach procedure, the appropriate missed approach procedure is first rendered on the display device 112 (302). Thereafter, the pilot 109 initiates the rendered missed approach procedure (304). In the depicted embodiment, the missed approach procedure comprises three legs, and is thus graphically rendered 402 in the display area 116 with three icons 404-1, 404-2, 404-3, each representative of one leg of the missed approach procedure. The processor 104 then determines whether the aircraft is flying (or at least substantially flying) the first leg of the rendered missed approach procedure (306). If the processor 104 determines that the aircraft is flying (at least sufficiently accurately) the first leg of the rendered missed approach procedure, the processor 104 will command the display device 112 to render the icon 404-1 that is representative of this leg with a first color (308). Moreover, because the second leg is to be flown next, the processor 104 will additionally command the display device 112 to render the icon 404-2 that is representative of the second leg with a second color, and to render the icon 404-3 that is representative of the third leg with a third color (308).

Figure 5:
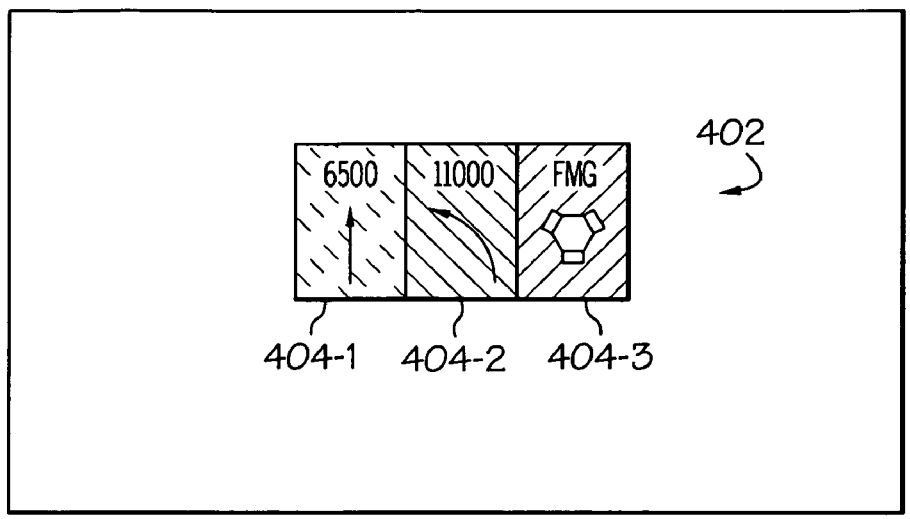

Thereafter, as depicted in FIG. 5, the processor 104 determines when the aircraft has flown (or at least substantially flown) the first leg of the missed approach procedure (310). When the processor 104 determines that the aircraft has flown the first leg of the rendered missed approach procedure and should be flying the next leg (e.g., the second leg), the processor 104 will command the display device 112 to render the icon 404-2 that is representative of the next leg with the first color (312). Because the previous leg (e.g., the first leg) has already been flown and the third leg is to be flown next, the processor will additionally command the display device 112 to render the icon 404-3 that is representative of the third leg with the second color, and to render the icon 404-1 that is representative of the first leg with the third color (or other color that differs from the first, second, and third color) (312).

This process 300 continues to repeat until all of the legs of the missed approach procedure have been completed (314).

Figure 6:
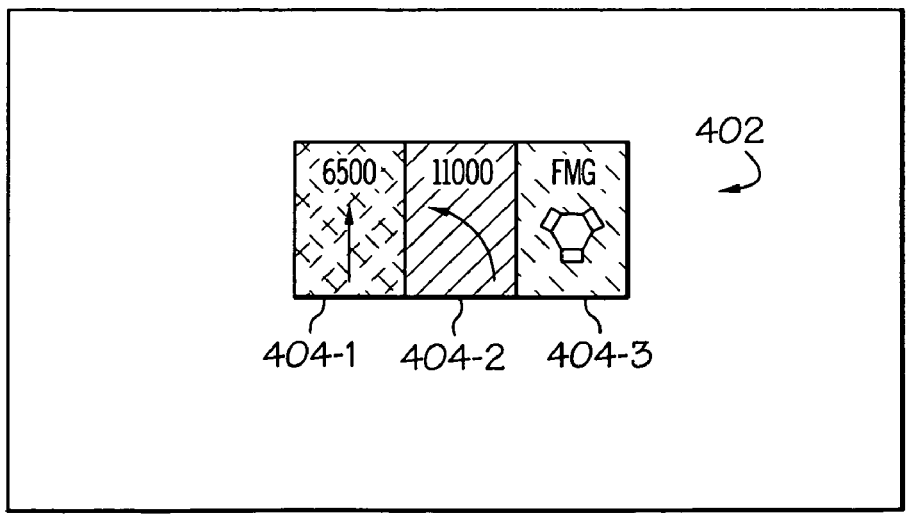

As FIG. 3 also depicts, if the processor 104 determines that the aircraft is actually not flying (at least sufficiently accurately) the leg of the missed approach procedure that it should be flying, then the processor 104 will command the display device 112 to render the icon 404 that is representative of this leg with, what is referred to herein as, a cautionary color (316). A non-limiting example of a suitable cautionary color is the color red. Although the specific cautionary color may vary, the color is preferably selected to be different from the first, second, and third (or more) colors used to render the icons as described in the previous paragraph. For example, FIG. 6 depicts a situation in which the processor 104 determined that the aircraft was actually not flying (at least sufficiently accurately) the first leg of the rendered missed approach procedure when it should have been flying this leg of the procedure. In this case, the processor 104 commanded the display device 112 to render the icon 404-1 representative of this leg with the cautionary color.

It is noted that in addition to (or instead of) rendering the appropriate icon 404 in a cautionary color, the processor 104 may be configured to cause an aural alert to be generated. For such embodiments, the system 100 may additionally include an aural device 118, which is depicted in phantom in FIG. 1. It will be appreciated that this aural alert could be implemented in anyone of numerous ways such as, for example, a buzzer, horn, alarm, or a voice indicator. In the depicted embodiment, the aural alert is generated by the processor 104; however, it will be appreciated that it could additionally be generated by a processor in the navigation computer 108 or other non-illustrated device.

Figure 7:
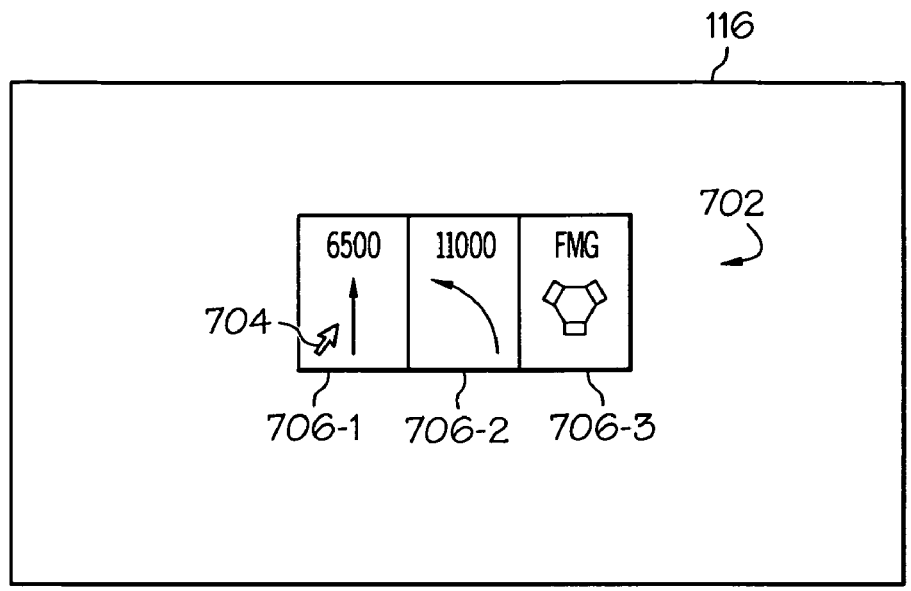

In some embodiments, the graphics that are representative of a missed approach procedure are, when rendered, part of the INAV and are selectable by a user, such as the pilot 109. In these embodiments, if the pilot 109 selects a rendered graphic 702 by, for example, placing a cursor 704 over one of the rendered icons 706, as depicted in FIG. 7, and pressing an appropriate user interface button (e.g., button on the CCD), the missed approach procedure will be automatically loaded into the active flight plan. If the appropriate flight director mode is (or has been) selected, the non-illustrated flight director may then automatically fly the missed approach procedure.

It was previously noted that numerous and varied missed approach procedures exist, and furthermore that each landing field may have a plurality of missed approach procedures. In order to generate appropriate graphics and, at least in some embodiments, text, and to allow a determination of whether the aircraft is flying (or at least substantially flying) each leg of a missed approach procedure, processes for generating data representative of a missed approach procedure were developed. One process involves generating missed approach procedure data from the remarks associated with already existent missed approach procedures. Another process, which was previously alluded to, involves generating missed approach procedure data, in real-time, from communications received from, for example, an air traffic control tower. These processes are depicted in flowchart form in FIGS. 8 and 9, respectively, and will now each be described.

Figure 8:
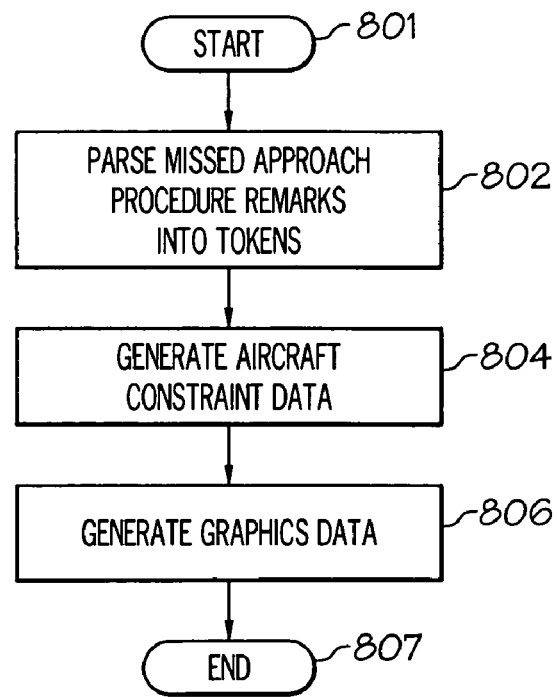
FIGS. 8 and 9 depict a processes, in flowchart form, of exemplary methods of generating missed approach procedure data.

Turning first to FIG. 8, this process 800 begins by parsing the plurality of remarks, which are essentially the textual form of the missed approach procedures, into a plurality of tokens (802). Although the specific form of the tokens may vary, in a particular preferred embodiment, each token comprises one or more alphanumeric characters that represent a leg of the missed approach procedure. For example, the first leg of missed approach procedure that is depicted in FIGS. 4-6 is a climb to 6,500 feet, and the token that is used to represent this leg may be #C 6500, the second leg is a climbing left turn to 11,00 feet, and the token used to represent this leg may be #C 1 11000, and the third leg is direct to FMG Vortac, and the token that is used to represent this leg may be #dvs2 FMG.

No matter the specific form of the tokens, it seen that aircraft constraint data (804) and graphics data (806) are also generated based on each of the remarks. The aircraft constraint data are data representative of aircraft state, such as aircraft altitude, heading, latitude/longitude, aircraft speed, etc., that the aircraft should be in during each leg of the missed approach procedure. The graphics data are used to generate the graphics and icons that are rendered and that graphically represent the missed approach procedure.

Figure 9:
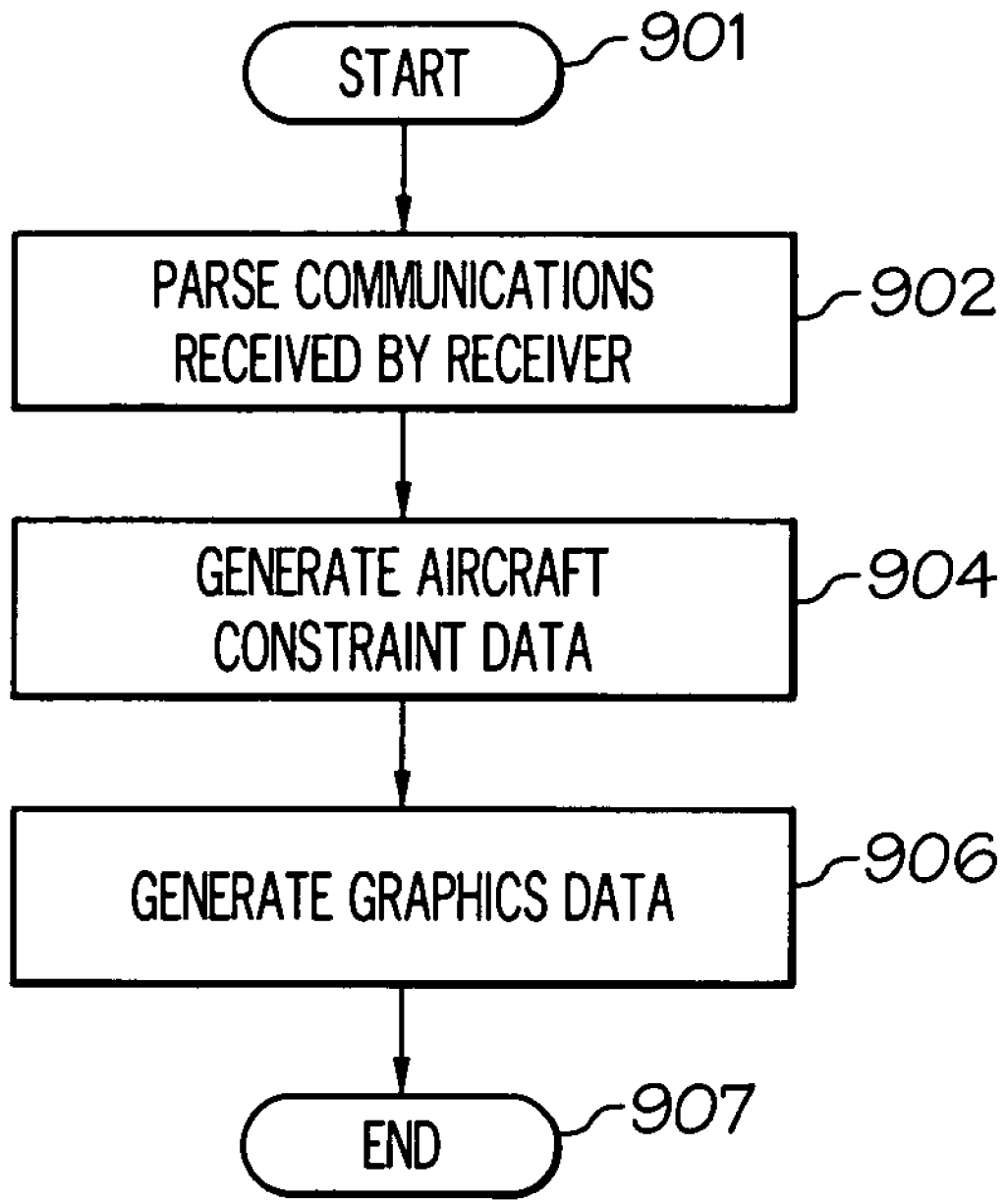

With reference now to FIG. 9, this process 900 begins by parsing, in real-time, the communications received by the receiver 110 (902). As was noted above, the communications received by the receiver 110 may be either voice or data communications. No matter the specific form of the received communications, the aircraft constraint data (804) and the graphics data (806) are then generated based on the parsed communications.

The systems and methods described herein provide various means of conveying missed approach procedures to a pilot in real-time and/or a means of providing feedback to the pilot as to where the aircraft is in a missed approach procedure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of conveying missed approach procedures to a pilot, comprising the steps of:
   rendering a graphic representation of at least one leg of the missed approach procedure on a display;
   determining, in a processor, whether the aircraft is at least substantially flying the at least one leg of the missed approach procedure; and
   selectively varying, in response to one or more commands from the processor, at least one visual characteristic of the rendered graphic representation of the at least one leg of the missed approach procedure based on the determination of whether the aircraft is at least substantially flying the at least one leg of the missed approach procedure,
   wherein:
   the missed approach procedure comprises a plurality of legs; and
   the rendered graphic includes a plurality of icons, each icon representative of one of the plurality of legs of the missed approach procedure.

2. The method of claim 1, further comprising:
   determining when the aircraft has at least substantially flown the at least one leg of the missed approach procedure represented by the rendered graphic; and
   varying the at least one visual characteristic of the rendered graphic when the aircraft has at least substantially flown the at least one leg of the missed approach procedure.

3. The method of claim 1, further comprising:
   selectively generating a sound based on the determination of whether the aircraft is at least substantially flying the at least one leg of the missed approach procedure.

4. The method of claim 1, further comprising:
   rendering text representative of the at least one leg of the missed approach procedure.

5. The method of claim 1, wherein the visual characteristic includes one or more of color, relative intensity, and relative size.

6. The method of claim 1, further comprising:
   determining that a leg of the missed approach procedure is to be flown; and
   rendering the leg of the missed approach procedure that has been determined is to be flown with a visual characteristic that differs from other legs of the missed approach procedure.

7. The method of claim 6, wherein the visual characteristic includes one or more of color, relative intensity, and relative size.

8. The method of Claim 6, further comprising:
   rendering text representative of the leg of the missed approach procedure that has been determined is to be flown.

9. The method of claim 1, further comprising:
   receiving a user input; and
   in response to the user input, automatically flying the at least one leg of the missed approach procedure that is represented by the rendered graphic.

10. The method of claim 9, further comprising:
    loading the at least one leg of the missed approach procedure that is represented by the rendered graphic into an active flight plan.

11. A display system for conveying missed approach procedures to a pilot, comprising:
    a display configured to render a graphic representation of at least one leg of the missed approach procedure; and
    a processor coupled to the display, the processor configured to (i) command the display device to render the graphic representation of the at least one leg of the missed approach procedure and (ii) determine whether the aircraft is at least substantially flying the at least one leg of the missed approach procedure and, in response to the determination, to selectively command the display to vary at least one visual characteristic of the graphic representation of the at least one leg of the missed approach procedure rendered on the display,
    wherein:
    the missed approach procedure comprises a plurality of legs; and
    the rendered graphic includes a plurality of icons, each icon representative of one of the plurality of legs of the missed approach procedure.

12. The system of claim 11, wherein the processor is further operable to:
    determine when the aircraft has at least substantially flown the at least one leg of the missed approach procedure represented by the rendered graphic; and
    command the display to vary the at least one visual characteristic of the rendered graphic when the aircraft has at least substantially flown the at least one leg of the missed approach procedure.

13. The system of claim 11, further comprising:
a speaker coupled to the processor and responsive to a signal to generate an audible sound,
wherein the processor is further operable, in response to the determination of whether the aircraft is at least substantially flying the at least one leg of the missed approach procedure, to selectively supply the signal to the speaker.

14. The system of claim 11, wherein:
the display is further configured to render text; and
the processor is further operable to command the display to render text representative of the at least one leg of the missed approach procedure.

15. The system of claim 11, wherein the visual characteristic includes one or more of color, relative intensity, and relative size.

16. The system of claim 11, wherein the processor is further operable to:
determine that a leg of the missed approach procedure is to be flown; and
command the display to render the leg of the missed approach procedure that it has determined is to be flown with a visual characteristic that differs from other legs of the missed approach procedure.

17. The system of claim 11, further comprising:
a user interface coupled to the processor and responsive to user input to supply a user selection signal;
wherein the processor is responsive to the user selection signal to load the at least one leg of the missed approach procedure that is represented by the rendered graphic into an active flight plan.

* * * * *